Patented May 22, 1951

2,553,770

UNITED STATES PATENT OFFICE 2,553,770

PARASITICIDAL COMPOUNDS CONTAINING THE NSCCl₃ GROUP

Allen R. Kittleson, Cranford, N. J., assignor to Standard Oil Development Company, a corporation of Delaware No Drawing. Application April 28, 1949, Serial No. 90,271

20 Claims. (Cl. 167—33)

This invention relates to new and useful improvements in parasiticidal preparations and more particularly to improved fungicides, insecticides and germicides. This invention also relates to methods of protecting organic material subject to attack by low orders of organisms. This invention further relates to the synthesis of new chemical compounds, N-thiotrichloromethyl imides of dicarboxylic acids.

This application is a continuation-in-part of U. S. application No. 773,925, filed September 13, 1947, now abandoned.

It has now been found that a large number of organic compounds containing the >NSCCl₃ are extremely effective for checking the growth of bacteria, fungi, and insects. These new compounds may thus be used as novel ingredients of seed and plant protectants because of their disinfecting action on soil containing harmful organisms.

The physiologically active compounds of this invention may thus best be represented as having the >NSCCl₃ group in which the nitrogen is linked to two carbon atoms, two acyl groups, or one acyl group and one carbon atom. The phrase acyl group refers to groups of the following character

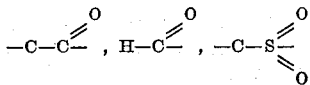

etc. (see Hackh, "Chemical Dictionary," second edition, page 21). When the nitrogen atom of the >NSCCl₃ is linked to one acyl group, the compounds may be regarded as amide derivatives, i. e., N-thiotrichloromethyl amides (or N-trichloromethylthio amides). When both of the free linkages of the >NSCCl₃ group are taken up by acyl groups, the compounds may be regarded as N-thiotrichloromethyl imides (or N-trichloromethylthio imides). (See Sidgwick's "Organic Chemistry of Nitrogen" 1937 edition, pages 136 and 152.)

Suitable amide compounds of the indicated type are thus illustrated in Formula I:

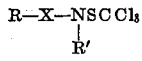

Formula I in which R represents an organic residue, X is part of an acyl group, such as for example

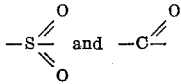

and R' represents an organic radical or a hydrogen radical.

Suitable imide compounds of the indicated type are illustrated by Formula II:

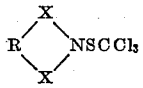

Formula II in which R represents one or more organic residues and X is part of an acyl group, such as for example

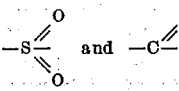

The organic residue may be aliphatic, aromatic, alicyclic, heterocyclic, and their substituted derivatives.

The novel N-thiotrichloromethyl imide compounds of this invention may be prepared in general by the reaction of perchloromethyl mercaptan (ClSCCl₃), with the corresponding imide or the metal salt of this compound. Formula III generally illustrates this reaction where M represents hydrogen or a metal, and where both of the acyl groups are derived from carboxylic acid groups.

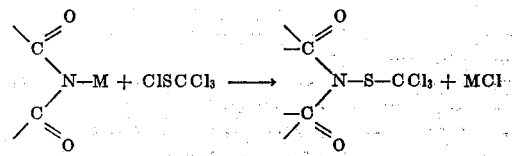

Formula III

The formula for the novel N-thiotrichloromethyl imides of this invention may be represented by:

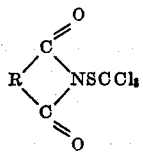

Formula IV where R is an organic residue. The organic residue may be aliphatic, aromatic, alicyclic, heterocyclic, and their substituted derivatives.

The preparation of the imide starting materials and their metal salts is well known in the art and is not the subject of this invention, and therefore has not been here described.

When the imide salt is used as a starting material for the production of N-thiotrichloromethyl imide derivatives of this invention, the salt is first dispersed in an organic liquid such as benzene or dioxane and while stirring and heating to about 50°–80° C., an approximately equal molecular quantity of perchloromethyl mercaptan is added over a period of about 1 to 2 hours. The reaction is continued for about 3 to 4 hours after all the mercaptan has been added. After cooling, the reaction mixture is filtered to remove the metal halide and any unreacted imide salt and in some cases, a portion of the N-thiotrichloromethyl imide. The remainder of the N-thiotrichloromethyl imide is recovered by concentrating the solvent filtrate and recrystallizing the residue from a suitable solvent. Any N-thiotrichloromethyl imide in the original filter cake may be recovered by washing with water to remove the metal halide and unreacted imide salt. The water-insoluble product may then be further purified by recrystallization from a suitable solvent.

The compounds of this invention can also be prepared by the general method disclosed in U. S. Serial No. 50,888, filed September 23, 1948, A. R. Kittleson and H. L. Yowell, of dissolving the desired imide, without first forming the metal salt, in aqueous alkaline solution, followed by addition of about an equal molecular quantity of perchloromethyl mercaptan. The mixture is stirred rapidly, conveniently, until the aqueous medium becomes acid to litmus, then filtered and air dried. An 85%–93% yield of N-thiotrichloromethyl imide of high purity is thus obtained. The reaction may be carried out at room temperature. In cases where the imide is readily hydrolyzed in alkaline solution, it may be advantageous to cool the reaction mixture as low as 0° C.

The metal compound used to supply the necessary alkaline solution is a compound of an alkali metal such as lithium, sodium and potassium, and the like. Because of cost factors, sodium and potassium are preferred. The alkali is present preferably in amounts equivalent to the imide used. While other basic compounds may be used, it is desirable to use the alkali hydroxides because of the consequent avoidance of the presence of other anion radicals which might have to be removed.

Variations on these procedures can be made, of course. Thus, the alkali metal imide salts, if available, can be dissolved directly in water and the process further carried on as indicated above for the aqueous solution reaction. The imides can also be dispersed directly in the organic media and finely divided alkali hydroxide or sodium added, thus forming the salt in situ. The process is then further carried on as described above.

The following examples are given to illustrate this invention and include both the preparation of the N-thiotrichloro-methyl imide compounds by both of the indicated methods, the test results obtained on the activity of these organic compounds and others containing the >NSCCl₃ group.

EXAMPLE I

*N-thiotrichloromethyl tetrahydrophthalimide*

Perchloromethyl mercaptan was reacted with the sodium salt of tetrahydrophthalimide to form N-thiotrichloromethyl tetrahydrophthalimide.

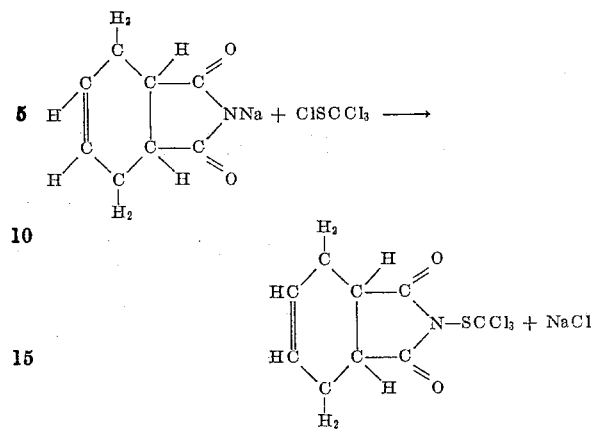

The sodium salt of tetrahydrophthalimide amounting to 0.4 mole was suspended in 400 cc. of dioxane in a 1-liter 3-necked flask, equipped with a stirrer, reflux condenser and dropping funnel. To this mixture, 56.8 g. (0.4 mole) of ClSCCl₃ dissolved 100 cc. of dioxane was added from the dropping funnel over a period of 20 minutes. Rapid stirring of the reaction mixture, which was at room temperature, was maintained during the addition of the perchloromethyl mercaptan and for 1½ hours after the addition was complete. The reaction mixture was allowed to stand at room temperature overnight, after which the precipitated NaCl was filtered off. The filtrate was cooled in an ice bath which resulted in the formation of 40 g. of a white crystalline precipitate which, on purification by recrystallization from carbon tetrachloride, had a melting point of 170°–172° C. and gave the following analysis:

|  | Per Cent N | Per Cent Cl | Per Cent S |
|---|---|---|---|
| Found | 4.38 | 34.40 | 10.07 |
| Theory | 4.67 | 35.50 | 10.67 |

EXAMPLE II

*N-thiotrichloromethyl phthalimide*

Sixty-eight g. (0.4 mole) of sodium phthalimide was suspended in dry benzene. To this mixture was added a solution of 74.4 g. (0.4 mole) of ClSCCl₃ in 100 cc. of benzene. The reaction mixture was heated to 50°–60° C. for four hours, then filtered when hot. The residue (37 g.) consisted of a mixture of sodium chloride and phthalimide. The filtrate was concentrated to half its volume and cooled. This resulted in the formation of a while crystalline precipitate (wt.=48 g.). On recrystallization from benzene, the product was essentially odorless and had a melting point of 177° C. Analysis of the product gave the following results:

|  | Per Cent C | Per Cent H | Per Cent S | Per Cent Cl |
|---|---|---|---|---|
| Found | 37.94 | 1.81 | 10.16 | 33.70 |
| Theory for NSCCl₃ | 36.5 | 1.35 | 10.81 | 35.96 |

EXAMPLE III

N-thiotrichloromethyl succinimide 60.5 g. of powdered sodium succinimide was dispersed in 300 cc. of benzene in a 1-liter, 3-necked flask equipped with a stirrer, thermometer, reflux condenser and dropping funnel. To the stirred mixture, 93 g. of ClSCCl₃ in 50 cc. of benzene was added slowly from the dropping funnel. During the addition of the ClSCCl₃ the temperature of the reaction mixture increased from 25° C. to 35° C. After all the ClSCCl₃ had been added, the reaction mixture was refluxed for 2½ hours at 79°–80° C., cooled to 55° C., and filtered to remove the precipitated NaCl. The filtrate was cooled, giving a white crystalline precipitate. 40 g. of product was recovered which, on recrystallization from ethyl alcohol-water mixture, had a melting point of 141° C.

Analysis of the final product gave the following results:

|  | Per Cent N | Per Cent Cl | Per Cent S |
|---|---|---|---|
| Found | 5.61 | 42.54 | 12.98 |
| Theory for 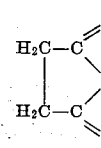 | 5.65 | 42.92 | 12.90 |

EXAMPLE IV

N-thiotrichloromethyl endomethylenetetrahydrophthalimide 77.4 g. of ClSCCl₃ in 50 cc. of benzene was added to a stirred suspension of sodium endomethylenetetrahydrophthalimide in 300 cc. of benezene. The procedure used in this experiment was the same as that described in Example III. A total of 84 g. of white crystalline material was recovered which, on purification by recrystallization from ethyl alcohol, had a melting point of 152°–153° C.

Analysis of the final product gave the following results:

|  | Per Cent N | Per Cent Cl | Per Cent S |
|---|---|---|---|
| Found | 4.36 | 33.67 | 10.40 |
| Theory for 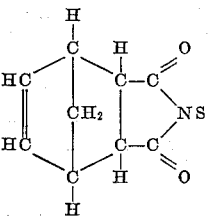 | 4.49 | 34.13 | 10.25 |

EXAMPLE V

Chlorinated N-thiotrichloromethyl tetrahydrophthalimide 60 g. (0.2 mole) of thiotrichloromethyl tetrahydrophthalimide was dissolved in 150 cc. of carbon tetrachloride in a 300 cc. flask equipped with an inlet tube for chlorine, a thermometer and an outlet tube leading to gas scrubbers containing water.

A slow stream of chlorine was bubbled through the solution at 20°–25° C., cooling being required to maintain this temperature.

The chlorination was continued until the reaction mixture had increased 10.5 g. in weight. The solvent was then stripped from the product, the last quantity being removed at 100° C. under reduced pressure.

71 g. of a straw-colored resinous material was recovered which had an odor of sulfur chloride when warm.

The water in the gas scrubbers was titrated with standard NaOH and found to contain 0.11 mole of HCl indicating that substitution as well as additional chlorination had taken place. Analysis of the final product gave the following results:

|  | Per Cent Cl | Per Cent C | Per Cent N |
|---|---|---|---|
| Found | 49.56 | 7.98 | 3.72 |
| Theory for C₉H₈O₂NSCl₅ | 47.8 | 8.63 | 3.78 |

EXAMPLE VI

N-thiotrichloromethyl tetrahydrophthalimide

A. Four moles (604 g.) of tetrahydrophthalimide, 2500 cc. of water, and 160 g. of sodium hydroxide were charged to a 5-liter flask equipped with a thermometer, stirrer and dropping funnel. After all the imide had dissolved, 744 g. of perchloromethyl mercaptan was added slowly from the dropping funnel. The mercaptan addition required two hours. Rapid agitation was maintained during the addition and for 1½ hours thereafter. The temperature of reaction was maintained at 10°–15° C. during this entire period. The reaction mixture was filtered, washed with water followed by methyl alcohol wash to remove a small amount of unreacted perchloromethyl mercaptan. After air drying, 1035 g. (86% yield) of a white powder was recovered having a melting point of 171° C. Analysis of the product gave the following results:

|  | Per Cent Cl | Per Cent S | Per Cent N | Per Cent C | Per Cent H |
|---|---|---|---|---|---|
| Found | 34.85 | 10.67 | 4.58 | 36.11 | 3.12 |
| Theory for 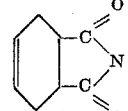 | 35.50 | 10.67 | 4.67 | 36.00 | 2.66 |

B. 4,530 g. of tetrahydrophthalimide was dispersed in 12 liters of ice and water in a 15 gal. steel drum equipped with two high speed stirrers. 1240 g. of NaOH dissolved in 12 liters of water was then added. After solution was complete, 5,500 g. of perchloromethyl mercaptan was added over a period of about twelve minutes. The temperature of the reaction mixture at the start was 6° C. and was maintained below 14° C. by the addition of ice. Very rapid agitation was maintained during the addition of perchloromethyl mercaptan and for 3½ hours thereafter, at which point the reaction mixture became acid to litmus. The mixture was then filtered, washed with water followed by a small quantity of methyl alcohol.

Recovered 7,840 g. (87.1% yield) of white solid M. P. 170°–171° C.

EXAMPLE VII

Preparation of N-thiotrichloromethyl phthalimide 147 g. of phthalimide (practical) and 400 cc. of isopropyl alcohol were charged to a 2-liter flask equipped with a stirrer, dropping funnel and thermometer. 400 cc. of ice and water containing 40 g. of NaOH were added and the mixture stirred until solution of the phthalimide was complete. Approximately 15 minutes was required for this step. With the temperature of the reaction mixture at 4° C., 186 g. of perchloromethyl mercaptan was added from the dropping funnel over a period of 5 minutes. Rapid stirring was maintained during the addition. The temperature of the reaction mixture increased rapidly to 24° C., then slowly decreased. The reaction solution became acid to litmus in less than one minute after all of the perchloromethyl mercaptan had been added. Stirring was continued for an additional five minutes, after which the product was filtered, the residue washed with water and air dried. Recovered 237 g. of a white powder, the crude product having a melting point of 165°–170° C. Analysis showed 9.50% sulfur and 37.3% chlorine.

EXAMPLE VIII

Preparation of N-thiotrichloromethyl succinimide 99 g. of succinimide and 250 cc. of ice water were charged to a 1-liter flask equipped as in Example 1. 250 cc. of ice water containing 40 g. of NaOH was added and the mixture stirred until solution was complete. 186 g. of perchloromethyl mercaptan was added from the dropping funnel over a period of 5 minutes, at which time the aqueous solution became acid to litmus. The reaction mixture was filtered with suction, washed with water, and air dried. Recovered 173 g. of a white powder having a melting point of 139°–141° C. The melting point of purified N-thiotrichloromethyl succinimide is 141° C.

The compounds described in this invention may thus be applied to parent materials to retard or prevent fungus growth and mildew formation. Since many of these compounds are exceptionally nonphytotoxic, they may be applied safely to a wide variety of plants. Some of the additional parent materials to which they may be applied for protective purposes are leather, wood, fur, wool, coated fabrics, and other substances.

These compounds may be reduced to an impalpable powder and applied as an undiluted dust or mixed with a solid carrier, such as clay, talc and bentonite, as well as other carriers known in the art, in order to bring the compounds into intimate contact with the parasites (see Frear, "Chemistry of Insecticides, Fungicides and Herbicides"). They may thus be applied as a spray in a liquid carrier, either as a solution in a solvent, or as a suspension in a non-solvent, such as water. When applied as a spray in water, it may be desirable to incorporate wetting agents.

The compounds of this invention in general are soluble in organic solvents such as acetone, ethyl alcohol, benzene, naphtha, etc., although different compounds exhibit different solubilities.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as the ricinoleic acid ester of sorbitol, and petroleum sulfonates of $C_{10}$ to $C_{20}$ length. The non-ionic emulsifying agents such as the ethylene oxide condensation products of alkylated phenols may also be used. It is to be understood that these and similar compounds are intended when the term wetting agent is used hereafter.

The compounds of this invention may also be admixed with carriers that are themselves active, such as other parasiticides, hormones, herbicides, fertilizers, and wetting agents. Stomach and contact insecticides such as the arsenates, fluorides, rotenone, and the various fish poisons and organic insecticides, such as di(p)-chlorophenyl-trichloroethane, benzene-hexachloride, and similar products may also be advantageously added.

EXAMPLE IX

Compounds of this invention were tested for parasiticidal activity. The compounds tested include the new compounds of this invention as well as other compounds containing the >NSCCl₃ group.

The values given in column I represent the percentage mortality of the test insects after 96 hours following a two-minute immersion in a 0.25% aqueous solution or suspension of the test compound.

The results in column II are given as per cent mortality of the test insect after 96 hours following bloodstream injection of 0.002 cc. of a 5% solution of the test compound.

The slide germination technique for fungicidal testing was carried out as described by Wellman and McCallan (Contributions of Boyce Thompson Institute, vol. 3, No. 3, pages 171–176) and is listed in column III as concentration of test compound in per cent to give an LD–50.

It should be noted from the data below that the compounds, in addition to being good stomach insecticides, were nearly all at least as good as, and usually better than, Bordeaux as fungicides.

| Compound | Column I | | Column II | | Column III | |
|---|---|---|---|---|---|---|
| | Contact Insecticidal Activity | | Bloodstream Insect. Activity *Periplanitus americana* (American Roach) | | Fungicidal Inhibiting Concentration, Per Cent | |
| | *Blattella germanica* (German Roach) | *Omelpeltus sociatus* (Milk Weed Bug) | Female | Male | *Alterneria solania* | *Sclerotinia fructicola* |
| N-thiotrichloromethyl tetrahydrophthalimide | 0 | 5 | 20 | 80 | 0.001–0.0001 | 0.001–0.0001 |
| N-thiotrichloromethyl phthalimide | 0 | 5 | 40 | 100 | 0.001–0.0001 | 0.001–0.0001 |
| N-thiotrichloromethyl endomethylene-tetrahydrophthalimide | 0 | 15 | 60 | 20 | 0.001–0.0001 | 0.001–0.0001 |
| N-thiotrichloromethyl succinimide | 15 | 40 | 100 | 100 | 0.001–0.0001 | 0.001–0.0001 |

| Compound | Column I — Contact Insecticidal Activity | | Column II — Bloodstream Insect. Activity Periplanitus americana (American Roach) | | Column III — Fungicidal Inhibiting Concentration, Per Cent | |
|---|---|---|---|---|---|---|
| | Blattella germanica (German Roach) | Omelpeltus sociatus (Milk Weed Bug) | Female | Male | Alterneria solania | Sclerotinia fructicola |
| Chlorinated N-thiotrichloromethyl tetrahydrophthalimide | 5 | 5 | 100 | 100 | 0.001 | 0.001 |
| N-thiotrichloromethyl 4-nitrophthalimide | 0 | 5 | 80 | 100 | <.0001 | <.0001 |
| N-thiotrichloromethyl 5,5 dimethyl oxazolidine 2,4 dione | 30 | 100 | 100 | 100 | <.0001 | <.0001 |
| N-thiotrichloromethyl 5 methyl 5 ethyl oxazolidine 2,4 dione | 5 | 0 | 100 | 100 | <.0001 | <.0001 |
| N-thiotrichloromethyl 5,5 pentamethylene oxazolidine 2,4 dione | 10 | 0 | 100 | 80 | <.0001 | <.0001 |
| N-thiotrichloromethyl 5 phenyl 5 methyl oxazolidine 2,4 dione | 0 | 0 | 0 | 80 | .001–.0001 | .001–.0001 |
| N-thiotrichloromethyl morpholine | | | | | .01–.001 | .001–.0001 |
| N-thiotrichloromethyl 5-isobutyl 5 methyl oxazolidine 2,4 dione | 0 | 5 | 80 | 100 | .0001 | .0001 |
| N-thiotrichloromethyl 5-cyclopropyl 5 methyl oxazolidine 2,4 dione | | | | | .001–.0001 | .001–.0001 |
| N-thiotrichloromethyl 2,4 dioxothiazolidine | | | | | .001–.0001 | <.0001 |
| N-thiotrichloromethyl o-benzoic sulfimide | | | | | .001–.0001 | .001–.0001 |
| N-thiotrichloromethyl N-butyl benzene sulfonamide | | | | | 0.1–0.01 | 0.01–0.001 |
| 3-thiotrichloro methyl 5,5 dimethyl hydantoin | | | | | 0.01–0.001 | 0.001–0.0001 |
| 1-nitro 3-thiotrichloromethyl 5,5 dimethyl hydantoin | | | | | 0.0001 | 0.0001 |
| 1-acetyl 3-thiotrichloromethyl 5,5 dimethyl hydantoin | | | | | 0.0001 | 0.0001 |
| N-thiotrichloromethyl N-phenyl benzene sulfonamide | | | | | 0.01–0.001 | 0.01–0.001 |
| N-thiotrichloromethyl C₉ alkanyl succinimide | 100 | 80 | 100 | 100 | .001–.0001 | .0001 |
| Bordeaux | | | | | 0.001 Cu | 0.001 Cu |

EXAMPLE X

A test on seed disinfecting activity was run. N-thiotrichloromethyl tetrahydrophthalimide was applied to pea seeds which were planted in soil infected with "damping off" fungi. Two commercial seed disinfectants (designated "A" and "B") were used as standards in this test. In each, ten seeds were planted. The results of this experiment are tabulated below:

| Treating Agent | Seeds Planted | Seeds Germinated | Damped off after Germination | Condition of Roots when examined (10 days) |
|---|---|---|---|---|
| None | 10 | 0 | | |
| N-thiotrichloromethyl tetrahydrophthalimide | 10 | 5 | 0 | 4 healthy root systems. |
| Commercial Compound "A" | 10 | 5 | 2 | None with healthy roots. |
| Commercial Compound "B" | 10 | 0 | | |

The effectiveness of this compound in the control of fungi is apparent from the fact that seeds treated with a compound of this invention were the only ones to exhibit healthy root systems.

EXAMPLE XI

Tests on growing bean plants were conducted in the green house as follows.

A group of bean plants were inoculated with fungus spores which cause mildew. Some of the plants were then sprayed with different concentrations of the N-thiotrichloromethyl tetrahydrophthalimide and after one week observed for mildew infection. The results were as follows:

| Per Cent N-thiotrichloromethyl tetrahydrophthalimide | Mildew on Bean Plants |
|---|---|
| None (control) | Very Heavy. |
| 1% | None. |
| 0.5% | Do. |
| 0.25% | Trace. |

Complete inhibition of mildew was thus obtained with as little as 0.5% of the indicated compound even though the plant hand been inoculated with mildew spores.

EXAMPLE XII

The compounds of this invention also exhibit bactericidal activity.

Laboratory and field tests have shown that n-thiotrichloromethyl tetrahydrophthalimide is effective against the organism causing "bacterial spot" on the fruit and leaves of peach trees.

Agar-cup-plate studies have shown these compounds to be effective against such organisms as *Staphylcoccus citreus*, *Streptococcus hemelytious* (Gr. A), *Streptococcus feccalis* and *Proteus vulgaris*.

The n-thiotrichloromethyl imides of this invention can also be prepared from industrial sources other than the pure chemicals. Thus for example it is common practice to refine cracked gasoline with maleic anhydride to remove gum forming diolefins. The maleic anhydride diolefin addition product, which normally has little commercial use, can then be converted to mixed imides and then further converted to products of this invention as discussed above. Thus by way of illustration, tetrahydrophthalic anhydride is one of the products obtained from the maleic anhydride refining of cracked gasoline. The tetrahydrophthalic anhydride, on treatment with ammonia, yields the corresponding imide which is then treated with perchloromethyl mercaptan to yield the N-thiotrichloromethyl tetrahydrophthalimide.

It is to be understood that the invention is not limited to the specific examples which have been offered merely as illustrations, since other derivatives can be prepared, and that modifications may be made without departing from the spirit of the invention.

What is claimed is:

1. The method of combatting fungi, bacteria and insects, which comprises distributing a combination of an organic chemical compound containing the >NSCCl₃ group linked to two carbon atoms of the residual organic compound and a carrier therefor to effect contact of said chemical compound with the fungi, bacteria and insects.

2. In a process for destroying fungi with a fungicidal composition containing an active fungicide wherein the fungicide is distributed by an inert carrier into intimate contact with the fungi, the improvement which comprises employing a chemical compound having the following general formula:

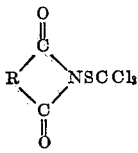

wherein R is an organic residue, as the fungicide.

3. A fungicidal dust composition comprising an N-thiotrichloromethyl imide of a dicarboxylic acid admixed with a solid, powdered, inert diluent.

4. As new chemical compounds N-thiotrichloromethyl imides of dicarboxylic acids.

5. As new chemicals, N-thiotrichloromethyl imide compounds corresponding to the following general formula:

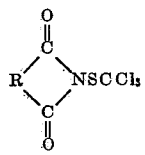

wherein R is an organic residue.

6. A parasiticidal composition containing as an active ingredient an organic compound containing the >NSCCl$_3$ group, linked to two carbon atoms of the residual organic compound, admixed with a surface active dispersing agent which lowers the surface tension of water and thereby promotes aqueous colloidal dispersions of the organic compound.

7. A fungicidal composition comprising an organic compound containing the >NSCCl$_3$ group linked to two carbon atoms of the residual organic compound dissolved in a solvent therefor.

8. A fungicidal composition comprising an organic compound containing the >NSCCl$_3$ group linked to two carbon atoms of the residual organic compound admixed with a solid, powdered, inert diluent.

9. A fungicidal composition comprising as an active ingredient an N-thiotrichloromethyl imide of a dicarboxylic acid contained in an aqueous emulsion with a wetting agent.

10. A fungicidal composition comprising as an active ingredient an N-thiotrichloromethyl imide of a dicarboxylic acid dissolved in a solvent therefor.

11. A fungicidal composition comprising as an active ingredient an N-thiotrichloromethyl imide of a dicarboxylic acid, admixed with a surface active dispersing agent which lowers the surface tension of water and thereby promotes aqueous colloidal dispersions of the imide.

12. The method of combatting fungi, bacteria and insects, which comprises treating material liable to attack by said fungi, bacteria and insects, with a composition containing an N-trichloromethylthioimide of a dicarboxylic acid as an active ingredient.

13. As a new chemical, N-trichloromethylthio tetrahydrophthalimide.

14. As a new chemical, N-trichloromethylthio phthalimide.

15. As a new chemical, N-trichloromethylthio succinimide.

16. As a new chemical, N-trichloromethylthio endomethylenetetrahydrophthalimide.

17. As new chemicals, chlorinated N-trichloromethylthio tetrahydrophthalimides.

18. A parasiticidal composition containing an organic compound, N-trichloromethylthio tetrahydrophthalimide, as an active ingredient, admixed with a surface active dispersing agent which lowers the surface tension of water and thereby promotes aqueous colloidal dispersions of the organic compound.

19. A parasiticidal composition containing an organic compound, N-trichloromethylthio phthalimide, as an active ingredient, admixed with a surface active dispersing agent which lowers the surface tension of water and thereby promotes aqueous colloidal dispersions of the organic compound.

20. A parasiticidal composition containing an organic compound, N-trichloromethylthio succinimide, as an active ingredient, admixed with a surface active dispersing agent which lowers the surface tension of water and thereby promotes aqueous colloidal dispersions of the organic compound.

ALLEN R. KITTLESON.

No references cited.